United States Patent
Clapham et al.

(10) Patent No.: US 10,678,766 B2
(45) Date of Patent: Jun. 9, 2020

(54) REAL-TIME INDEX GENERATION

(71) Applicant: British Telecommunications Public Limited Company, London (GB)

(72) Inventors: Philip Clapham, London (GB); Kai Priday, London (GB)

(73) Assignee: British Telecommunications Public Limited Company, London (GB)

(*) Notice: Subject to any disclaimer, the term of this patent is extended or adjusted under 35 U.S.C. 154(b) by 190 days.

(21) Appl. No.: 15/740,664

(22) PCT Filed: May 18, 2016

(86) PCT No.: PCT/EP2016/061094
§ 371 (c)(1),
(2) Date: Dec. 28, 2017

(87) PCT Pub. No.: WO2017/001109
PCT Pub. Date: Jan. 5, 2017

(65) Prior Publication Data
US 2018/0196839 A1    Jul. 12, 2018

(30) Foreign Application Priority Data
Jun. 29, 2015 (EP) .................................. 15174267

(51) Int. Cl.
*G06F 17/00* (2019.01)
*G06F 16/22* (2019.01)
*H04L 12/26* (2006.01)

(52) U.S. Cl.
CPC .......... *G06F 16/2237* (2019.01); *H04L 43/04* (2013.01); *H04L 43/0894* (2013.01)

(58) Field of Classification Search
CPC ...... G06F 16/13; G06F 16/182; G06F 17/246; G06F 3/067; G06F 3/1206; G06F 16/188
See application file for complete search history.

(56) References Cited

U.S. PATENT DOCUMENTS 6,535,150 B1    3/2003  Ross
2001/0038642 A1*  11/2001  Alvarez, II ............. H03M 7/30
                                                                370/477
(Continued)

FOREIGN PATENT DOCUMENTS

WO    WO 2011/015199 A1    2/2011

OTHER PUBLICATIONS

Francesco Fusco et al.: "Real-Time Creation of Bitmap Indexes on Streaming Network Data", The VLDB Journal; The International Journal on Very Large Data Bases, Springer, Berlin, DE, vol. 21, No. 3, Jul. 30, 2011, pp. 287-307, XP035056143, ISSN: 0949-877X, DOI: 10.1007/S00778-011-0242-X.

*Primary Examiner* — Truong V Vo
(74) *Attorney, Agent, or Firm* — Patterson Thuente Pedersen, P.A.

(57) ABSTRACT

A computer implemented method of real-time index generation of data in a data stream during data stream recording to an archive, the method including: receiving a byte of the data stream; and adding an entry for the byte of the data stream to a bitmap index of bytes, the bitmap index indicating, for each possible byte value, a location in the archive of each of occurrences and non-occurrences of the byte value by a sequence of bit values in the bitmap index, wherein the bitmap index includes a count of a number of occurrences for each byte value, wherein a plurality of run length encoding (RLE) schemes are applied to sub-sequences of identical bit values for each byte value in the index, each RLE scheme having a different encoding type identified by an encoding type indicator and indicating a bit value and a number of bits in a sub-sequence, and wherein a pair of RLE encoded sub-sequences of indications of non-occurrence of a byte value implies a single indication of an occurrence of the byte value between the pair.

8 Claims, 11 Drawing Sheets

(56) References Cited

U.S. PATENT DOCUMENTS

2006/0140496 A1* 6/2006 Gandolph ................ H04N 1/64
  382/245
2008/0062020 A1   3/2008 Lakus-Becker

* cited by examiner

| Byte Value | Loc 0 | Loc 1 | Loc 2 | Loc 3 | ... |
|---|---|---|---|---|---|
| 0 | 0 | 0 | 0 | 1 | ... |
| 1 | 0 | 1 | 0 | 0 | ... |
| 2 | 0 | 0 | 1 | 0 | ... |
| ... | | | | | |
| 254 | 1 | 0 | 0 | 1 | ... |
| 255 | 0 | 0 | 0 | 0 | ... |

```
int addItemToIndex(uint64 newRecordId)
{
   zeroesToAdd = newRecordId - nextRecordId
   if (zeroesToAdd > 0)
      If currently building an RLEOne
         Store the RLEOne
      If zeroesToAdd is more than we can store in the current Literal
      AND have just stored an RLEZero
      AND only the first bit is set in the current Literal
         Overwrite the current Literal with an RLEZero of zeroesToAdd
         //This makes an implied hit
      Else If at least one bit is set in the current Literal
         If zeroesToAdd wont fit in this Literal
            Store as many Zeroes as possible in current Literal
            Store the Literal
            If the number of Zeroes left wont fit in a Literal
               Store an RLEZero for the remaining Zeroes
            Else
               Skip the remaining zeroes
         Else
            Skip zeroesToAdd bits
            If the Literal has reached capacity
               Store the Literal
      Else //Literal is all Zeroes so far
         If the Zeroes and the hit wont fit in this Literal
            Overwrite this empty Literal with an RLEZero
         Else
            Skip the zeroes in this Literal
      Set the next bit in the Literal
      If the Literal has reached capacity
         Store the Literal
   Else
      If currently building an RLEOne
         Add to its count
      else
         Add the hit to the Literal
         If the Literal has reached capacity
            If the Literal is all 1's
               Overwrite Literal with an RLEOne with the correct count
               Now building an RLEOne
            Else
               Store the Literal
   Increment nextRecordId
   Increment hitCount for this column
}
```

FIGURE 10

```
{bool,uint64} find()
{
    While not at the end of this bitmap column
        If positionInWord == 0 //Not done anything with the current word
            readWord
        If word is a Literal
            Use positionInWord to mask away any of the Literal we've already read
            If there's a hit left in the masked Literal
                Increment positionInWord to point at the hit
                foundAt += positionInWord
                return {true, foundAt}
            Else
                Advance to next word
                Round recordId up to the end of the Literal
                positionInWord = 0
        Else //Word is an RLE
            If its an RLEOne
                If positionInWord is less than the RLE count
                    Increment recordId
                    Increment positionInWord
                    lastType = RLEOne
                    return {true, recordId}
                else
                    Advance to next word
                    positionInWord = 0
            Else //Its an RLEZero
                If lastType == RLEZero
                    //Theres an implied hit here
                    Increment recordId
                    lastType = RLEOne //So the implied hit doesn't get found again
                    return {true, recordId}
                recordId += rleCount
                positionInWord = 0
                Advance to next word
            lastType = current RLE type (RLEZero or RLEOne)
    return {false, 0}
}
```

FIGURE 11

```
boolean findAt(uint64 foundAt)
{
   While not at the end of this bitmap column
      If positionInWord == 0 //Not done anything with current word
         Read next word
         If word is a Literal
         AND recordId + capacity of Literals < foundAt
            //The hit can't be in this Literal
            continue to next loop in the outer 'while'
      If word is a Literal
         Use positionInWord to mask away any of the Literal we've already read
         If there's a hit left in the masked Literal
            Increment positionInWord to point at the hit
            recordId += positionInWord
            If foundAt == recordId
               return true
            Else if recordId > foundAt
               //Make sure the hit is found next time
               Decrement positionInWord
               Decrement recordId
               return false
         Else
            Advance to next word
            Round recordId up to the end of the Literal
            positionInWord = 0
      Else //word is an RLE
         If its an RLEOne
            If recordId + RLE Count - positionInWord >= foundAt
            AND positionInWord < RLE Count
               lastType = RLEOne
               Increment positionInWord
               Increment recordId
               If recordId == foundAt
                  return true
               Else if recordId > foundAt
                  return false
         Else //Its an RLEZero
            If lastType == RLEZero //Theres an implied hit here
               lastType = RLEOne //So the implied hit doesn't get found again
               Increment recordId
               if (recordId == foundAt)
                     return true
            recordId += RLE Count
            positionInWord = 0
            Advance to next word
            If recordId > foundAt
               return false
   return false
}
```

FIGURE 12

```
{bool,uint64} find()
{
   found = false;
   uint64 foundAt = 0;
   while (found == false)
      found,foundAt = childWithLowestHitCount.find()
      if (found == false)
         break
      for each other childSortedByHitCount, while found == true
         found = child.findAt(foundAt)
   return {found, foundAt}
} boolean findAt(uint64 foundAt)
{
   bool found = true;
   for each childSortedByHitCount while found == true:
      found = child.findAt(foundAt)
   return found;
}
```

FIGURE 13

```
{bool,uint64} find()
{
    If (multiMapOfNextResults.empty()
        //This initialisation stage is only done once.
        for each child
            found, foundAt = child.find()
            if (found == true)
                multiMapOfNextResults.insert(foundAt, child)
                //Note that multiple children can return the same value for
                //foundAt, and all children will be put in
                //multiMapOfNextResults under that result
    foundAt = multiMapOfNextResults.lowestKey
    if (foundAt)
        for each child in multiMapOfNextResults.find(foundAt)
            //Refresh the next key for each child who had foundAt
            found, newFoundAt = child.find()
            if (found == true)
                multiMapOfNextResults.insert(newFoundAt, child)
        multiMapOfNextResults.removeAll(foundAt)
        return {true, foundAt}
    return {false, 0}
} boolean findAt(uint64 foundAt)
{
    bool found = false;
    for each childSortedByHitCount, while found == false
        child.findAt(foundAt)
    return found;
}
```

FIGURE 14

```
{bool,uint64} find()
{
    If foundAt is -1
        //This initialisation stage is only done once.
        found, foundAt = child.find()
        if !found
            foundAt = totalPacketsStored
    while nextToReturn < totalPacketsStored
        if nextToReturn < foundAt
            Increment nextToReturn
            return {true, nextToReturn - 1}
        Else
            found, foundAt = child.find()
            if !found
                foundAt = totalPacketsStored
        Increment nextToReturn
    return {false, 0}
} boolean findAt(uint64 foundAt)
{
    If (foundAt < totalPacketsStored)
        return ! child.findAt(foundAt)
    return false;
}
```

REAL-TIME INDEX GENERATION

CROSS-REFERENCE TO RELATED APPLICATIONS

The present application is a National Phase entry of PCT Application No. PCT/EP2016/061094, filed on May 18, 2016, which claims priority to EP Patent Application No. 15174267.3, filed on Jun. 29, 2015, which are hereby fully incorporated herein by reference.

TECHNICAL FIELD

The present disclosure relates to the generation of indexes, in particular the generation of indexes in real time.

BACKGROUND

Data generated or occurring in a high data rate data stream can be recorded for subsequent search and retrieval. An example of such data is computer network traffic such as network packets occurring in a computer network at high data rates. As the data rate increases so too does a volume of data for recording. Large volumes of data are slow to search and access. Efficient and accurate indexing is necessary to provide timely and reliable search. As a volume of data grows so too does the time required to generate an index for the data. Furthermore it can be desirable to search recorded data soon after it is recorded leaving little opportunity to generate or regenerate an index for the data.

SUMMARY

Accordingly it would be advantageous to provide ready efficient and accurate indexing for data occurring at high data rates.

The present disclosure accordingly provides, in a first aspect, a computer implemented method of real-time index generation of data in a data stream during data stream recording to an archive, the method comprising: receiving a byte of the data stream; and adding an entry for the byte of the data stream to a bitmap index of bytes, the bitmap index indicating, for each possible byte value, a location in the archive of each of occurrences and non-occurrences of the byte value by a sequence of bit values in the bitmap index, wherein the bitmap index includes a count of a number of occurrences for each byte value, wherein a plurality of run length encoding (RLE) schemes are applied to sub-sequences of identical bit values for each byte value in the index, each RLE scheme having a different encoding type identified by an encoding type indicator and indicating a bit value and a number of bits in a sub-sequence, wherein a pair of RLE encoded sub-sequences of indications of non-occurrence of a byte value implies a single indication of an occurrence of the byte value between the pair.

In embodiments the data stream is network traffic on a communications network and the index is generated during line-rate network traffic recording.

In embodiments a sub-sequence of indications of non-occurrence of a byte value having a bit length exceeding the capacity of all encoding types is encoded using at least two RLE encoding types, and where the at least two RLE encoding types encode indications of non-occurrence of the byte value an RLE encoded indication of an occurrence of the byte value is provided between each such encoded indications of non-occurrence, the RLE encoded indication of an occurrence of the byte value indicating a zero length so as to prevent an implied single indication of an occurrence between the at least two encoded indications of non-occurrence.

In embodiments a size of the bitmap index is reduced by excluding trailing indications of non-occurrences of a byte value in a sequence of bit values of the byte value.

In embodiments the bitmap index includes, for each byte value, an indication of a size of a sequence of bit values for the byte value.

In embodiments the indication in the bitmap index of a location in the data stream is provided by reference to at least two intermediate arrays providing a base and offset to, when combined, address the recording of the data stream.

The present disclosure accordingly provides, in a second aspect, a method for searching recorded network traffic for the occurrence of a plurality of search bytes using the bitmap index of any of claims 2 to 6 to identify indications of occurrence of each search byte wherein the search bytes are searched in order of frequency of occurrence in the bitmap index based on the count of a number of occurrences for each possible byte value in the bitmap index.

The present disclosure accordingly provides, in a third aspect, a computer system to generate an index of data in a data stream in real-time during data stream recording to an archive, the computer system comprising a processor and a data store wherein the processor is adapted to: receive a byte of the data stream; and add an entry for the byte of the data stream to a bitmap index of bytes, the bitmap index indicating, for each possible byte value, a location in the archive of each of occurrences and non-occurrences of the byte value by a sequence of bit values in the bitmap index, wherein the bitmap index includes a count of a number of occurrences for each byte value, wherein a plurality of run length encoding (RLE) schemes are applied to sub-sequences of identical bit values for each byte value in the index, each RLE scheme having a different encoding type identified by an encoding type indicator and indicating a bit value and a number of bits in a sub-sequence, wherein a pair of RLE encoded sub-sequences of indications of non-occurrence of a byte value implies a single indication of an occurrence of the byte value between the pair.

The present disclosure accordingly provides, in a fourth aspect, a computer program element comprising computer program code to, when loaded into a computer system and executed thereon, cause the computer to perform the method as described above.

BRIEF DESCRIPTION OF THE DRAWINGS

An embodiment of the present disclosure will now be described, by way of example only, with reference to the accompanying drawings, in which:

FIG. 6 is pseudo-code of an algorithm for building an index according to an exemplary embodiment of the present disclosure.

FIG. 10 is pseudo-code of a "find" algorithm for searching a next hit in an index in accordance with exemplary embodiments of the present disclosure.

FIG. 11 is pseudo-code of a "findAt" algorithm for seeking to determine if a specific Record ID is a hit in accordance with exemplary embodiments of the present disclosure.

FIG. 12 is pseudo-code of a "find" algorithm for searching an AND search structure in accordance with exemplary embodiments of the present disclosure.

FIG. 13 is pseudo-code of a "find" algorithm for searching an OR search structure in accordance with exemplary embodiments of the present disclosure.

FIG. 14 is pseudo-code of a "find" algorithm for searching an INVERT search structure in accordance with exemplary embodiments of the present disclosure.

DETAILED DESCRIPTION

Figure 1:
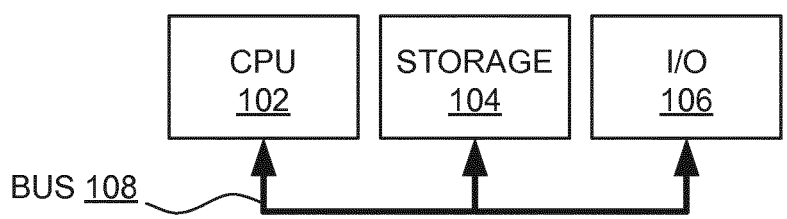
FIG. 1 is a block diagram of a computer system suitable for the operation of embodiments of the present disclosure.

FIG. 1 is a block diagram of a computer system suitable for the operation of components in embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
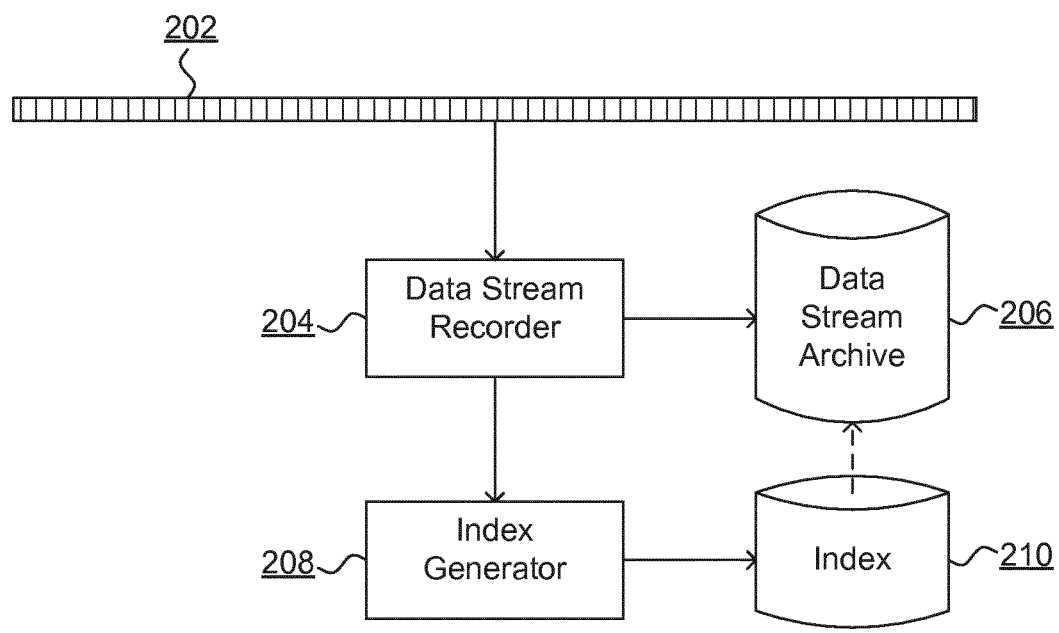
FIG. 2 is a schematic illustration of an arrangement for generating an index of data in a data stream in accordance with embodiments of the present disclosure.

FIG. 2 is a schematic illustration of an arrangement for generating an index of data in a data stream in accordance with embodiments of the present disclosure. A data stream 202 is a sequence of digital data items such as may be generated and/or communicated by data processing apparatus, sensors, detectors, networking equipment and the like. For example, the data stream 202 is a stream of network traffic occurring on a communications network such as a wired or wireless network. The data stream 202 is substantially continuous for a period of time save for a potential for gaps or spaces in the stream 202 between data items. For example, data items occurring in the data stream 202 can include network packets communicated via a communications network between any number of network endpoints and/or intermediate network components such as routers, switches and the like. The continuity, nature, structure, size and content of such network packets is thus not necessarily consistent.

A data stream recorder 204 is a hardware, software, firmware or combination component including logic to access and record data occurring in the data stream 202. The data stream recorder 204 records the data in the data stream continuously to a memory such as a volatile or non-volatile storage as a data stream archive 206.

An index generator 208 is provided as a hardware, software, firmware or combination component in communication or integral with the data stream recorder 204. The index generator 208 includes logic adapted to generate a bitmap index 210 of data that is recorded in the data stream archive 206. The index generator 208 is arranged to generate the bitmap index 210 in real-time such that as data is recorded by the data stream recorder 204 the index generator 208 generates and/or updates one more indexes 210 for the data. The bitmap index 210 is an index of a data word occurring in a data item in the data stream archive 206. Thus, while a single index 210 is illustrated in FIG. 2 it will be apparent to those skilled in the art that any number of indexes may be generated, depending on data in data items in the stream 202 that is selected for indexing. For example, data items in the data stream 202 can be network packets communicated via a computer network such as internet protocol (IP) packets. Such packets can include header metadata such as source address, destination address, port information and the like. Each item of such metadata can be a multi-byte field and a bitmap index 210 may be generated and maintained for each byte in each field in the metadata. A detailed example of such an approach is described below.

By way of example for the purpose of the present description, the word size occurring in a data item in the data stream archive 206, on which basis each index 210 is generated, is selected to be a single byte. Thus each byte of each field of indexed data occurring in each data item in the archive 206 is indexed by a byte-specific index 210. The index 210 provides, for each possible value of a byte (i.e. from 0 to 255), a location in the archive 206 of each of occurrences and non-occurrences of the byte value by a sequence of bit values in the bitmap. This is explained further by way of example with reference to FIGS. 3 and 4.

Figures 3, 4:
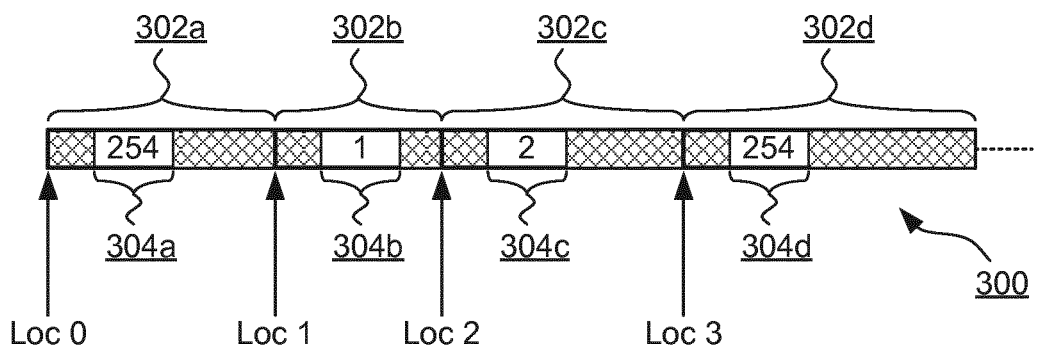
FIG. 3 illustrates a portion of an exemplary data stream archive in accordance with embodiments of the present disclosure.
FIG. 4 is a schematic illustration of an exemplary bitmap index for the data items of FIG. 3 in accordance with embodiments the present disclosure.

FIG. 3 illustrates a portion 300 of an exemplary data stream archive 206 in accordance with embodiments of the present disclosure. The archive portion 300 includes four data items 302a, 302b, 302c and 302d each having a particular byte of metadata 304a, 304b, 304c, 304d for indexing. Thus the byte of metadata (collectively 304) is the indexed byte 304. Each data item can be addressed at a location in the archive 206 such that: data item 302a is addressed at location "Loc 0"; data item 302b is addressed at location "Loc 1"; data item 302c is addressed at location "Loc 2"; and data item 302d is addressed at location "Loc 3." Such locations may be addressed directly or indirectly, such as by way of offsets from a start or base location in the archive 206.

FIG. 4 is a schematic illustration of an exemplary bitmap index 400 for the data items of FIG. 3 in accordance with embodiments the present disclosure. It will be appreciated by those skilled in the art that the particular arrangement of the index 400 of FIG. 4 is purely exemplary and other arrangements and data structures may alternatively be employed. The index 400 of FIG. 4 includes an entry 402 for each possible value of the indexed byte 304, thus values 0 through to 255. As data items (collectively 302) are received and processed by the index generator 208 (which in one embodiment occurs while the data stream recorder 204 records the data items to the archive 206) an entry in the index 400 is created for each data item 302. Thus considering first data item 302a, index entry 404a is generated for byte 304a occurring in data item 302a. The index entry 404a has associated the location "Loc 0" of the first data item 302a in the archive 206. The index entry 404a also includes an indication of the occurrence of value "254" for indexed byte 304a by setting a binary bit value to "1" in the index entry 404a corresponding to the byte value 254. All other bit values in the index entry 404a for all other byte values are set to "0." Thus the bit value "1" in index entry 404a indicates an occurrence of the byte value "254" in a data item located at "Loc 0" in the archive 206. Further, the bit values "0" in index entry 404a indicate a non-occurrence of the byte values "0" to "253" and "255" in the data item located at "Loc 0" in the archive 206. As can be seen in FIG. 4, further index entries 404b, 404c and 404d are generated corresponding to bytes 304b, 304c and 304d occurring in data items 302b, 302c and 302d, respectively.

As bytes are added to the index 400 then a sequence of bit values is formed for each byte value. Thus, for example, the sequence 406 of bit values "0010" is formed for byte value "2" in the index 400 of FIG. 4. These sequences of bit values are searchable to identify occurrences of the byte having a particular byte value and in this way the index 400 constitutes a bitmap index.

The bitmap index 210 in accordance with the present disclosure has a number of distinct characteristics the combination of which provide for: a reduction in the time required to generate and update the index 210; improved performance when searching the data stream record 206 with the index 210; and small index size.

Firstly, the bitmap index includes a count of a number of occurrences for each byte value. Thus referring to FIG. 4: the byte value "0" occurs with a count of 1; the byte value "1" occurs with a count of 1; the byte value "2" occurs with a count of 1; the byte value "254" occurs with a count of 2; and the byte value "255" occurs with a count of 0. Such counts provide for optimized searching of the bitmap index 210 as a number of possible matches of a particular byte value is readily determined without parsing a sequence of bit values for the byte value.

In an embodiment, a size of the bitmap index is reduced by excluding trailing indications of non-occurrence of a byte value in a sequence of bit values. For example the sequence of bit values in index 400 for byte value "1" is "0100." The trailing "00" is not required and can be removed so reducing a size of the sequence. Additionally, in some embodiments an indication of a size (i.e. length or number of bits) of each sequence of bit values for byte values is included in the index. For example this allows for the identification of byte values that do not occur in the archive 206 and for which no sequence need be recorded in the index. The inclusion of a size of the sequence for each byte value therefore allows for variable length sequences between byte values based on the size indicator.

Secondly, run length encoding (RLE) is applied to each sequence of bit values for each byte value so as to compress the sequences. RLE provides for encoding of sub-sequences of identical bit values for each byte value in the index 210. RLE involves providing an RLE indicator identifying a stream of bits as an RLE encoding as opposed to a literal bit representation. The RLE indicator has associated an indication of a bit value that is repeated and a number of repetitions of the bit value. Bitmap encoding schemes usually dedicate a number of bits to indicate which words are RLEs and which are literals (i.e. a literal expression of data as opposed to encoded RLE data). This, combined with the indications of a value of a sequence of RLE encoded bits, serves to reduce the number of bits which are available for expressing a length of the RLE sub-sequence or a literal sequence of bits. Bitmap encoding schemes typically specify a single word size that is used throughout. In contrast, according to embodiments of the present invention, multiple different RLE schemes are applied to sub-sequences each having a different encoding type. For example, a short run of bit value "0" can be encoded in a "short zero RLE", while a longer run of bit value "0" can be encoded in a "long zero RLE". Similarly a short run of bit values "1" can be encoded in a "short one RLE", and a longer run of bit value "1" can be encoded in a "long one RLE". In an embodiment, a particular bit in a word is not designated as an indicator of a type of RLE scheme. Rather, RLE schemes that are (or are anticipated to be) more common are assigned a shorter number of type bits to free up more bits for useful storage. For example, a word starting "1" can indicate a first type of RLE scheme having a particular word length and bit value. A word starting "01" can indicate a second type of RLE scheme having a particular, potentially different, word length and bit value. A word starting "001" can indicate a third type, and so on. Notably as more bits are consumed indicating the word type, fewer bits are potentially available for bit value encoding though word sizes can vary.

Thirdly, each RLE sequence is optimized by the use of implied bit value "1" between a pair of RLE encoded sub-sequences of indications of non-occurrence of a byte value. Thus where a bit value 1 occurs in isolation between sub-sequences of zeros and the zeros are encoded using an RLE encoding scheme, methods according to the present disclosure imply a bit value of 1 between the RLE encoded sequences of zeros. In this way the consumption of literal words to encode isolated bit values of 1 is avoided. This approach is particularly beneficial since additional RLEs or special additional type-indicators, flags and the like are not required to indicate the need for an implied bit, so saving space in the bitmap. Further, pairs of contiguous RLE encoded sub-sequences where each encoding in the pair uses any RLE encoding scheme (e.g. any RLE type, length, format or encoding type) will lead to an implied bit therebetween provided only that the bit value encoded by the consecutive pair or RLE encodings is the same. That is to say that the use of a first RLE encoding a relatively short sequence of zeros (e.g. an 8 bit RLE encoding) followed immediately by a second RLE encoding a relatively long sequence of zeros (e.g. a 16 bit RLE encoding) would imply a bit value of one therebetween. Thus embodiments of the present disclosure do not require fixed RLE encoding types for such implication to be effective.

Occasionally a sub-sequence of zeros in a sequence of bit values can be longer than can be accommodated by an RLE encoding scheme. In such situations multiple RLE encodings are provided: one or more up to the maximum length that can be accommodated by the RLE encoding scheme; and a final RLE encoding for remaining zeros. Such a situation can be described as an RLE overflow since a run of bit values overflows from a first RLE encoding to subsequent RLE encodings. Since embodiments of the present disclosure imply a bit value 1 between RLE encoded sequences of zeros, inappropriate implied bit values of 1 would be inserted in the event of RLE overflow. Accordingly embodiments of the disclosure can provide for the insertion of an RLE encoding of a sub-sequence of bit value 1 between adjacent RLE encodings for sub-sequences of zeros in the event of overflow, where a length of the RLE encoded sub-sequence of bit value 1 is zero. Such a zero-length sub-sequence of bit value 1 precludes an implied bit value 1.

In some embodiments of the present disclosure further performance improvements are realized by ensuring that the beginning of each RLE or Literal is at the start of a particular word size—e.g. the start of a byte. Thus the RLE types can be defined such that each RLE or literal starts at the beginning of a byte. In some circumstances it is therefore necessary to pad literals with part of a subsequent RLE so as to ensure an entire literal is used up before an RLE entry in the bitmap. For example, an 8-bit literal encoding with a 2-bit field type indicator (i.e. 2 bits to indicate that the byte is a literal) has 6 bits for storing literal data. If only three bits are required to store literal data before a lengthy run of, say, 100 zeros, then three of the run of 100 zeros will be added to the literal to ensure byte alignment and only 97 zeros would be RLE encoded in the subsequent RLE word. Ensuring byte alignment in this way provides significant performance benefits when searching the index all literals and RLEs will always start at the beginning of a new byte. Notably, due to the use of variable RLE encoding types or schemes, the length of an RLE encoding could extend to multiple bytes.

Figure 5:
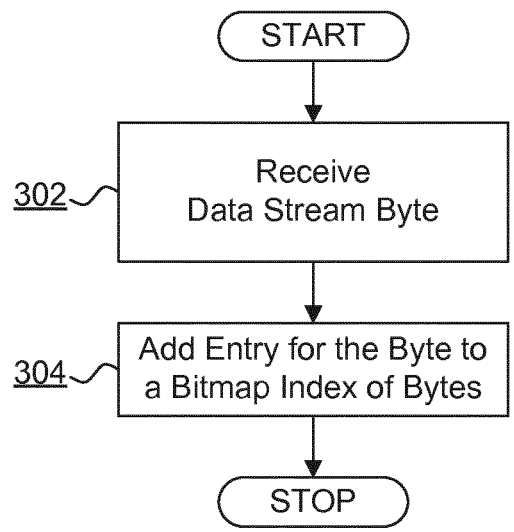
FIG. 5 is a flowchart of a method of real-time index generation of data in a data stream during data stream recording to an archive in accordance with embodiments of the present disclosure.

FIG. 5 is a flowchart of a method of real-time index generation of data in a data stream during data stream recording to an archive 206 in accordance with embodiments of the present disclosure. Initially at 302 the method receives a data stream byte. Subsequently at 304 the method adds an entry for the byte to a bitmap index 206 of bytes, such index having the particular characteristics described above.

An exemplary embodiment of the present disclosure in use will now be described with respect to the recording and indexing of network traffic in a communications network such that a data stream is network traffic and data items are network packets.

In the exemplary embodiment fields are indexed from internet protocol (IP) version 4 or 6 packets. Each packet includes metadata for indexing including: source and destination addresses; IP Next Protocol; and transmission control protocol (TCP)/user datagram protocol (UDP) source/destination ports, if available. These fields are commonly referred to as a 5-tuple. A search of archived network packets can include any or all fields from the 5-tuple, any of which may have a bitmask applied, and can also use concepts like AND, OR and NOT, which allows a great deal of complexity.

Table 1 shows an amount of data in each packet metadata field. It is not possible for a single packet to fill every field simultaneously (except in tunneling scenarios which are not considered here) and a typical IPv4 TCP packet would only have 13 bytes of metadata to store. It is possible for the TCP/UDP ports to be omitted (for non-TCP/UDP traffic), however non-IP traffic is not indexed at all in the exemplary embodiment, meaning that one source address, one destination address, and the IP next protocol fields are mandatory in the exemplary embodiment.

TABLE 1

| Field | Size (bytes) |
| --- | --- |
| IPv4 Source Address | 4 |
| IPv4 Destination Address | 4 |
| IPv6 Source Address | 16 |
| IPv6 Destination Address | 16 |
| IP Next protocol | 1 |
| TCP/UDP Source Port | 2 |
| TCP/UDP Destination Port | 2 |

Thus a total of 45 bytes is required for indexing.

All data is considered as a set of individual bytes. Each multi-byte field is assigned an index for each byte with each index maintained independently. Thus a total of 45 indexes are maintained for the IP packet metadata. In one embodiment the indexes are maintained within a single file. If additional searchable metadata fields are added (such as TCP flags, packet length, etc.) these would require the addition of further indexes.

An index file is paired with an archive that contains actual packets recorded from the network. Each packet in the archive is preceded by a small header which includes a nanosecond timestamp for the packet and the packet length. The index file and the archive are time-bound such that the file names or other associated file information/metadata indicate a start of a period for which packets are stored in the archive and indexed in the index. A system configuration can indicate a maximum amount of time that can be covered by each archive and index file. This provides broad time-windowing for searching packets. Fine time-windowing is provided on a per-packet basis, using the nanosecond timestamp in the packet header.

The index provides a way to find the Record ID of a packet of interest. This Record ID can be used as an offset into a tiered array to find the exact byte offset of the packet in the archive. For example, the Record ID can be first bit-shifted right by 18 places and the shifted value looked up in a first tier array to find a 64-bit base offset. The Record ID (unshifted) can then be looked up in another array to find a 32-bit secondary offset. The secondary offset is then added to the base offset to find a precise offset of the packet in question within the archive. This technique significantly reduces an amount of space required to express a 64-bit offset for every possible packet. For example to provide a 64-bit offset for 4 million packets per second for 60 seconds directly would require 1.92 Gigabytes but using a tiered approach such as described above it only requires approximately 960 Megabytes. This tiered approach is possible due to prior knowledge of the data as 218 packets of even jumbo size (9018 bytes) only attain about half the maximum value of an unsigned 32-bit value, meaning that the maximum value of the secondary offset cannot be exceeded before the base offset changes.

The packet offset array also can have a small header, which is a 64-bit unsigned integer of the total number of packets in the index. These arrays can be included within the index file.

Construction of the index proceeds as follows. A byte is composed of 8 bits which give it a total of 256 possible values. To store each byte a Bitmap is used which sets a single bit to 1 to indicate that a particular Record ID achieved a particular value. The Record ID can thus be derived from the index of the bit which has been set. Table 2 illustrates a basic example of a Bitmap; however care must be taken when reading it. The convention for Bitmaps is to show all possible values down the Y axis (still known as columns, hereinbefore sequences of bit values in the bitmap), and to add a Record by adding a new X axis value. This Bitmap shows the following sequence of bytes: 1, 254, 1, 255. When stored in an index file the bits in the columns are stored sequentially, such that the first byte of the Bitmap below could be naively stored as: 00001010.

TABLE 2

| | Record ID | | | |
| --- | --- | --- | --- | --- |
| Byte Value | 0 | 1 | 2 | 3 |
| 0 | 0 | 0 | 0 | 0 |
| 1 | 1 | 0 | 1 | 0 |

TABLE 2-continued

| Byte Value | Record ID | | | |
|---|---|---|---|---|
| | 0 | 1 | 2 | 3 |
| 2 | 0 | 0 | 0 | 0 |
| ... | | ... | | |
| 254 | 0 | 1 | 0 | 0 |
| 255 | 0 | 0 | 0 | 1 |

The index according to the present disclosure improves on a basic Bitmap index in a number of ways using a set of techniques collectively called Implicating Variable Run-Length-Encoded Index (IMVARLEX). Unlike other Bitmap encoding schemes, IMVARLEX is subject to the constraint that the data to be stored cannot be sorted to improve its Bitmap characteristics because the Record ID is used to find the packet location within the archive file. This constraint makes many of the optimizations that are traditionally applied to Bitmap encoding schemes unusable, such as sorting the input data to group similar terms.

In the exemplary embodiment a header of two 64-bit integers is stored for each column (sequence of bit values for a byte value) in the index, meaning the header is always 4,096 bytes. The first integer is the column size, which indicates the total number of whole bytes that are used for the column. This is important because it allows columns that are used less (or stored more efficiently) to consume less space, or not be stored at all. For example, Table 2 has no bytes that took value of 0 or 2 to 253, therefore an index in the exemplary embodiment would not store bit values for these byte values, simply storing a zero for column size. For other columns (such as 255 in the example above) only two bits (or more likely a single byte) would need to be stored, as it is only necessary to store sub-sequences of 0's that occur before a 1.

The second number of the column header stores the total number of "hits" or 1's in that column. For example the hit count for Table 2 column 1 would be 2, column 255 would be 1, and column 2 would be 0. This allows for early query optimization as it becomes efficient to evaluate how many hits are possible when querying a particular Bitmap's column.

RLE is a technique used in Bitmap encoding techniques that allows the expression of repeated 1's or 0's as a single unit; for example 0000000000000000 (16 zeroes) can be expressed as just the number 16, which consumes much less space. RLEs also specify what is repeated (known here as the RLE indicator), so the RLE above would need to include the fact that it is a zero which is being repeated 16 times. Some Bitmap encoding schemes go further, and instead of storing a number of bits which is repeated they store the number of complete words that are composed entirely of a specified repeated bit. RLEs are not suitable for sporadic data; data such as 00111001 would likely consume more space if it were Run-Length-Encoded than in its raw state. Data like this is often stored in its raw form; storing exactly those bits, which is frequently known as a Literal.

Bitmap encoding schemes usually dedicate a number of bits to indicate which words are RLEs and which are Literals. This, combined with the RLE indicator, reduce the number of bits which are available for expressing a length or sequence of bits. Bitmap encoding schemes often specify a single word size which is used throughout, so a 32-bit word could be used for 31 bits of Literal (with one bit dedicated to distinguishing it from an RLE) or an RLE with 29 bits for a length and one bit for an indicator bit. In contrast, according to the exemplary embodiment of the present disclosure, RLEs of appropriate size are used for a number to be encoded. Additionally, a particular bit is not designated as an indicator, instead RLEs that are known, observed or identified as more common are assigned a shorter number of type bits which frees up more bits for useful storage. This still allows RLEs to store sequences of zeroes or ones, although zeroes can be found to be more common in some situations. According to the exemplary embodiment the word types in Table 3 defining different RLE encoding schemes are employed.

TABLE 3

| Type Name | Bits in word | Type Bits | Usable Bits | Description |
|---|---|---|---|---|
| RLEZero-8 | 8 | 1 | 7 | Up to 127 zeroes |
| Literal | 8 | 01 | 6 | Represents 6 records |
| RLEZero-16 | 16 | 001 | 13 | Up to 8191 zeroes |
| RLEOne-8 | 8 | 0001 | 4 | Up to 15 ones |
| RLEOne-16 | 16 | 00001 | 11 | Up to 2047 ones |
| RLEZero-32 | 32 | 000001 | 26 | Up to 67,108,863 zeroes |
| RLEOne-32 | 32 | 0000001 | 25 | Up to 33,554,431 ones |

In terms of encoding efficiency it is advantageous to have as many bits as possible available in the smaller, most frequently used, RLE encoding schemes. For example if a number of usable bits an RLE-8 can be increased then it is possible to reduce a number of RLE-16s that are required for small values.

In the exemplary embodiment it is observed that a frequent pattern of Bitmap data has a number of 0's interrupted by a single 1 (hit), followed by a number of 0's. For many Bitmap encoding schemes this constitutes a very poor degree of encoding efficiency. According to the exemplary embodiment an RLE with indicator bit set to 0 (i.e. an RLEZero) directly followed by another RLEZero is understood to mean that there was a single hit between the two RLEs. This algorithm is only possible because the RLEs in accordance with the exemplary embodiment count a number of bits instead of complete words.

The implied hit process may add additional complexity to RLE encoding in the case of encoding very long sub-sequences of identical bits. If an index needs to encode a number of bits longer than a biggest RLE scheme of a particular type can express it does so by encoding the maximum value possible in that RLE, then an RLE of the opposite value with a length of zero, then more RLEs (with more zero-length RLEs separating them as necessary) until the number is expressed. The zero-length RLE prevents the index from expressing an implied hit between the two consecutive RLEs. For example, to encode 67,113,863 zeroes the index would encode an RLEZero-32 with a length of 67/108,863 (the maximum the RLEZero-32 can encode) then an RLEOne-8 with a length of 0, then an RLEZero-16 with a length of 5,000. These are termed overflows.

FIG. 6 is pseudo-code of an algorithm for building an index according to an exemplary embodiment of the present disclosure. This algorithm shows only the steps involved in index building; at the execution of Algorithm 1 a column (i.e. the number between 0 and 255) and a Record ID have already been established. Note that the whole process is oriented around adding "hits" to the index—that is, indications of an occurrence of a byte value; therefore before and after adding an item to the index it is always either adding a Literal (perhaps an empty one) or an RLEOne. Whenever a word (a Literal or an RLE) is stored the assumption is that a Literal will be built next. It is at the point of storing an RLE that its length is evaluated and the most appropriate RLE size is decided upon.

Tables 4 and 5 show examples of the result of the pseudo code of FIG. 6 on a sequence of numbers. For these examples a single column (byte value) is considered for simplicity. The first Record ID is always 0. In these examples the encoded binary has been annotated with the "type bits" underlined for clarity. This has the effect of showing where each word begins (in view of the variable word length due to the use of multiple RLE encoding schemes). In the interpretation section of each table, the number following the "x" indicates how many bits the RLE is replacing, and for a literal the binary that follows the "-" indicates the exact binary this literal contains.

TABLE 4

| | |
|---|---|
| Record IDs of "hits" | 15, 16, 18, 5000, 5100, 5101, 5102, 5103, 5104, 5105, 5106, 5107, 5108, 5109 |
| Column Header | Column Size: 6. Hit Count: 14 |
| Encoded Binary | 10001111 01001011 00110011 01110011 11100011 00011010 |
| Interpretation | RLEZero-8x15, Literal-001011, RLEZero-16x4979, Implied Hit, RLEZero-8x99, RLEOne-8x10 |

TABLE 5

| | |
|---|---|
| Record IDs of "hits" | 0, 2, 3, 4, 5, 7, 8, 10, 11, 10000000, 77110863, 77110864, 77110865, 77110866 |
| Column Header | Column Size: 14. Hit Count: 14 |
| Encoded Binary | 01111101 01110110 00000100 10011000 10010110 01110100 00000111 11111111 11111111 11111111 00010000 00100111 11001111 01001111 |
| Interpretation | Literal-111101, Literal-110110, RLEZero-32x9999988, Implied Hit, RLEZero-32x67108863, RLEOne-8x0, RLEZero-16x1999, Literal-001111 |

The Record ID is obtained from the index of the bit which is set. This requires additional care when using RLE as it is necessary to keep track of a number of Record IDs that have been passed (in a literal) and skipped (in an RLE). From the start of the example of Table 4 the first 15 Record IDs (numbered 0 to 14) are skipped by an RLE, meaning the next Record ID (in a literal this time) must be 15. The Record ID is then used to obtain a byte offset to advance to in the archive which is where the packet begins, as detailed above.

An approach to searching an index according to the exemplary embodiment will now be described. The index search proceeds in a similar fashion to the index creation in that it must return Record IDs in order, to allow better disk access characteristics on the packets to be extracted.

A first stage of searching an index is to determine a time window in which the search must operate. This is achieved on a coarse level by the separation of index files by time window as previously described. On a fine level this can only be achieved by analyzing packet headers in the archive for nanosecond timestamps and aborting a search once a packet outside the desired search window is encountered.

The next stage is to understand a query that is to be run. Queries can be complex and their grammar and syntax is explored elsewhere. An exemplary embodiment of the invention produces a template search structure which is recursive in nature. A primordial search structure is referred to as the "Single" and performs an actual search of a particular index for a specific value, for example the first IPv4 Source octet for value 192. Other search structures have a child group of search structures, applying a logical function to their result, such as AND or OR. A further search structure is INVERT, which has a child search structure and inverts its result. Any search structure can be the root of a search, which allows the construction of complex and simple queries. It will be apparent to those skilled in the art that other and more complex search structures and arrangements of search structures could be employed.

Figure 7:
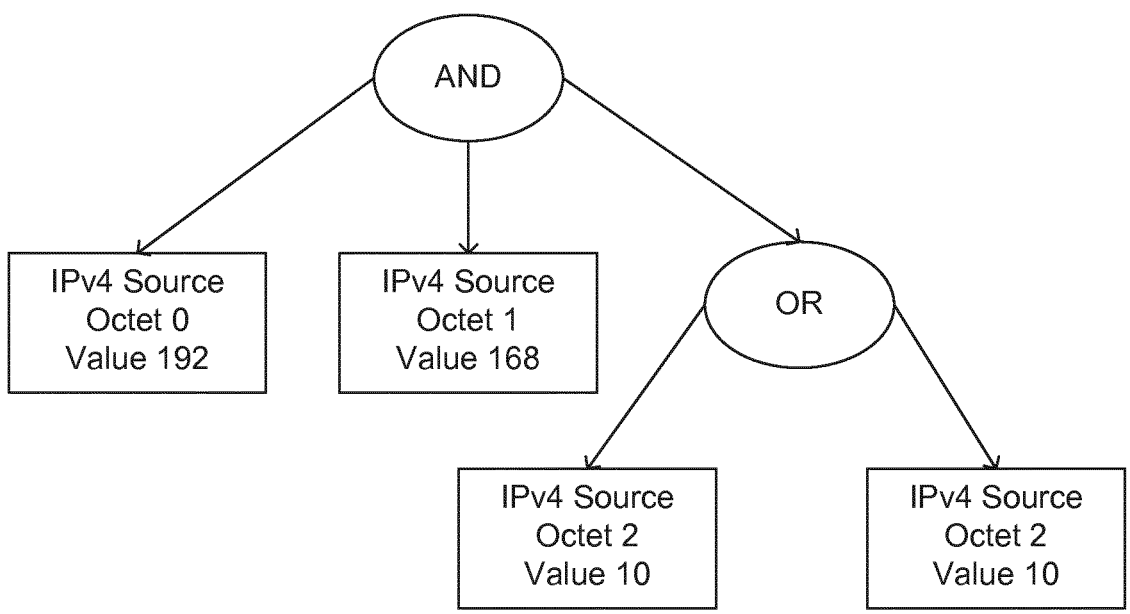
FIG. 7 depicts search criteria formed of search structures for searching an IPv4 Source address 192.168.10.0 with a bitmask 255.255.254.0 according to an exemplary embodiment of the present disclosure.

At a template creation stage bitmasks are expanded by considering the expansion of the bitmask as a collection of search structures for the same index under an OR. FIG. 7 depicts search criteria formed of search structures for searching an IPv4 Source address 192.168.10.0 with a bitmask 255.255.254.0 according to an exemplary embodiment of the present invention. If additional terms are to be included in the search (such as IPv4 Destination address, for example) then they could be grouped under the root AND structure or other search structures could be introduced where appropriate. In FIG. 7 note that IPv4 Source Octet 4 is not inspected at all because of the bitmask of 0 for that term, and none of the other terms (like source port, destination address, etc.) are inspected either.

Figure 8:
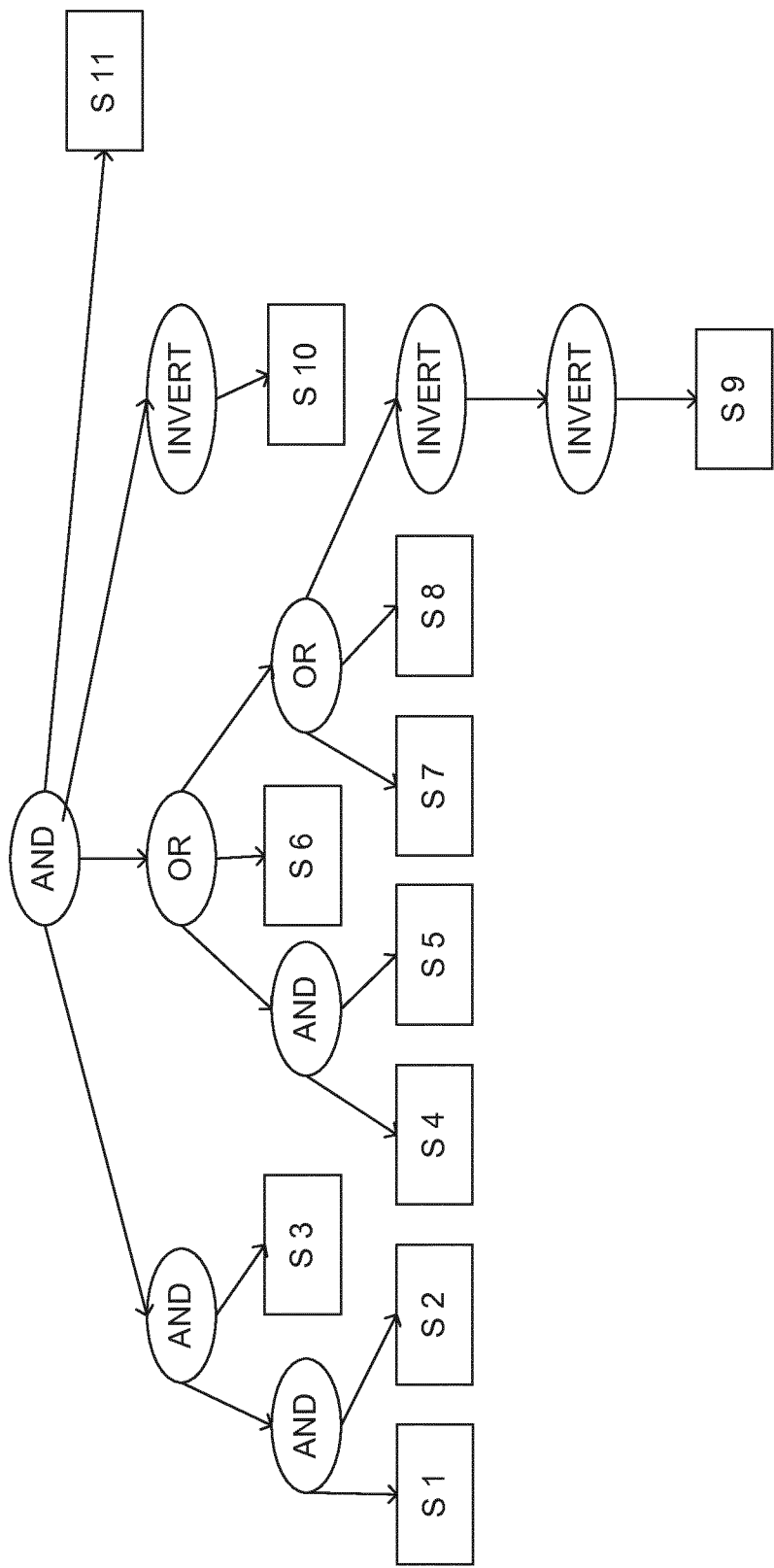
FIG. 8 illustrates exemplary search criteria including search structures in accordance with an exemplary embodiment of the present disclosure.
Figure 9:
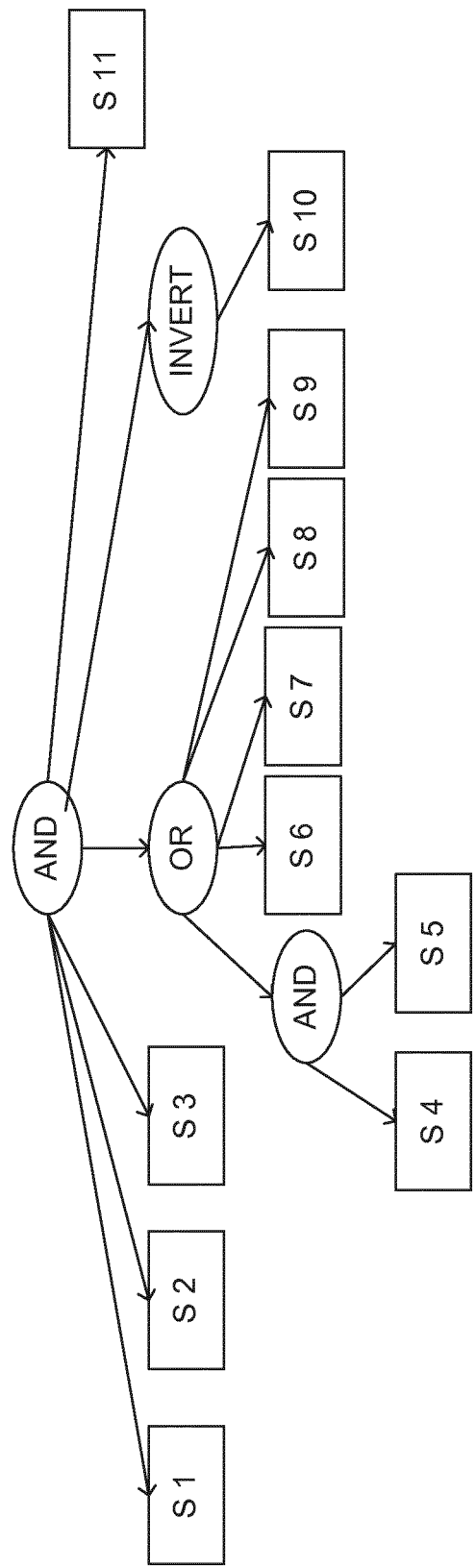
FIG. 9 illustrates the exemplary search criteria of FIG. 8 having search structures merged in accordance with an exemplary embodiment of the present disclosure.

The next stage of building a search template is a merger stage whereby all AND nodes that directly contain AND nodes (or OR nodes that directly contain OR nodes) adopt their "grandchildren" to reduce the depth of the tree whilst still providing the same logical function. This process is shown in FIGS. 8 and 9. FIG. 8 illustrates exemplary search criteria including search structures in accordance with an exemplary embodiment of the present disclosure. FIG. 9 illustrates the exemplary search criteria of FIG. 8 having search structures merged in accordance with an exemplary embodiment of the present disclosure. If an INVERT structure has a child INVERT structure both are destroyed leaving only grandchild structures attached to a structure where the original INVERT was attached. Note that if an AND contains an OR which contains an AND, this will not merge. It would be possible at this point to also carry out an optimization phase based on knowledge of the search, for example an INVERT followed by an OR representing a match on a bitmask of 254 could be replaced by a Single for the value in question.

The search template is then applied to a particular index file which produces actual search structures and leaves the template unmodified for reuse. With the search understood the index is loaded behind a memory mapped pointer, such that only data that is accessed is loaded from disk. The base offsets table (discussed above with respect to a tiered array) is loaded from the file into memory, however a secondary offset table is left behind a memory mapped pointer. With relevant sections of the index file loaded the search is optimized so that within each search structure the search term that has a lowest Hit Count is searched first. These techniques vastly reduce the amount of data that is loaded from disk and searched.

Two methods are available to search a search structure. The first is "find," which seeks a next hit, returning true (and a hit location) if successful. The second is "findAt," which seeks to determine if a specific Record ID is a hit, returning true if it is. The start of the search can be considered the base case of a recursive search structure's operation. The "find" method is called on a root search structure, which calls "find" on the child that has the lowest Hit Count until that child is a Single, at which point a Bitmap is searched for a hit. Then the "findAt" method is used across the other search structures to see if the Record ID that was found matches across the entire search structure. FIG. 10 is pseudo-code of a "find" algorithm for searching a next hit in an index in accordance with exemplary embodiments of the present disclosure. The Single is the Search Structure that actually searches the index. As a result it is always found at every leaf of a Search tree. It maintains state between function calls to keep track of its position, and returns Record IDs in order. Once it has run out of hits it will return false, and will continue to do so no matter how many times it is called.

FIG. 11 is pseudo-code of a "findAt" algorithm for seeking to determine if a specific Record ID is a hit in accordance with exemplary embodiments of the present disclosure. The "findAt" method of the Single only works if used in order; it will return false if used out of order. It mostly works the same as the "find" method, but with some shortcuts built in to avoid lines of code that are very frequently hit.

FIG. 12 is pseudo-code of a "find" algorithm for searching an AND search structure in accordance with exemplary embodiments of the present disclosure. As seen in FIG. 12, the AND search structure stops searching its children as soon as one of them returns false from a search, providing a "lazy evaluation" strategy.

FIG. 13 is pseudo-code of a "find" algorithm for searching an OR search structure in accordance with exemplary embodiments of the present disclosure. The OR "find" method will call the "find" method of each of its children, storing the result of each. It then returns the lowest Record ID returned, and calls "find" again on the children that returned that result, storing the result again. This allows it to return the results in the correct order. The "findAt" 'findAt' method is simpler, and stops calling its children's "findAt" methods as soon as one of them returns true.

FIG. 14 is pseudo-code of a "find" algorithm for searching an INVERT search structure in accordance with exemplary embodiments of the present disclosure. INVERT behaves slightly differently; it stores the location of the hit of its child and then returns the lowest Record ID that's less than that hit. For example if an INVERT's child found a hit at Record 4, sequential calls to the INVERT's "find" method would return Record IDs 0, 1, 2 and 3. The next call would cause the INVERT to call its child's "find," which could be 6, which would cause the INVERT to return 5. This pattern continues until the total number of packets stored comes into play, preventing an invalid return. Calling "findAt" on an INVERT will simply return the reverse of the INVERT's child's "findAt" method, until the Record ID being checked is greater than or equal to the total number of packets stored.

Once a Record ID has been successfully returned by the root search structure's "find" method (and thus by all its children) it is looked up in the offsets tables behind the memory mapped file pointer. This packet offset is then returned to the caller, so that it can advance the paired archive file to the specified offset and perform the final check that the packet's timestamp falls within the search specification.

Embodiments of the present disclosure have been implemented and tested for performance comparison with prior approaches. Three large packet archives were used to assess index building performance in terms of file size and speed. These packet archives vary in packet size, content, protocols, etc, and show a large range of data. Tables 6, Table 7, Table 8 and Table 9 show the statistics that were interpreted from building indexes from each of the files. These statistics were obtained when reading large "packet capture" files from disk in a "packet-at-a-time" manner, which is known not to perform at very high speeds. When fully integrated into an application the index will be built from data that is already in-memory, so the performance should be higher. For all the tests two child threads were used to encode data into the Bitmaps, whilst one parent thread read data from the packet archive and queued up batch jobs for the child threads.

Table 6 shows that the time to build the index is not a clear function of the number of packets and that it varies considerably based on the data being encoded. In the table, the total index file size is the sum of the Bitmaps size and the Offsets size. The high number of implied hits should be given consideration in each example, as for each of those hits a more conventional Bitmap encoding scheme would have needed at least one additional byte, if not more.

TABLE 6

| Capture | Total Packets (millions) | Build Time from Packet Archive (seconds) | Total Index File (MB) | Bitmaps Size (MB) | Offsets Size (MB) | Implied Hits (millions) | Total Variable Words (millions) |
|---|---|---|---|---|---|---|---|
| A | 130 | 27.8 | 1843 | 1324 | 519.3 | 559 | 945 |
| B | 47 | 17.5 | 920 | 738 | 181 | 382 | 529 |
| C | 32 | 15.6 | 550 | 422 | 127 | 162 | 329 |

Table 7 shows the percentage of each word type used in each example. Embodiments of the present invention can be optimized for maximizing the utilization of small and frequently used RLEs such as RLEZero-8, and as a result of this the size of its index is hugely reduced from other Bitmap encoding schemes.

TABLE 7

| Capture | % Literals | RLEZero-8 | RLEZero-16 | RLEZero-32 | RLEOne-8 | RLEOne-16 | RLEOne-32 |
|---|---|---|---|---|---|---|---|
| A | 33.2 | 25.0 | 39.4 | 0.2 | 1.9 | 0.2 | 0 |
| B | 19.4 | 41.1 | 39.2 | 0.06 | 0.14 | 0.004 | 0 |
| C | 35.7 | 36.3 | 27.4 | 0.2 | 0.29 | 0.14 | 0 |

Table 8 and Table 9 should be read as a single table and show how much of each word type is utilized. This should be read with Table 5 for context. This indicates that on average the RLEZero-8 is only about 35% utilized (as its maximum value is 127), however the high standard deviation reveals the spread of values present. Of other interest is the RLEZero-32, which was not used very often (see Table 7) but did manage to overflow 22 times in capture A. The RLEOne-32 was never used, which is why it requires the highest number of "type bits" to indicate its presence. It is still very possible however, which is why it was not excluded entirely.

TABLE 8

| | RLE-8 | | | | | |
|---|---|---|---|---|---|---|
| | Literal | | Zero | | One | |
| Capture | Avg | St. Dev | Avg | St. Dev | Avg | St. Dev |
| A | 2.89 | 1.34 | 44.84 | 34.24 | 8.40 | 2.45 |
| B | 1.93 | 0.97 | 43.52 | 34.39 | 7.97 | 2.19 |
| C | 1.93 | 1.01 | 36.48 | 33.04 | 8.88 | 2.76 |

TABLE 9

| | RLE-16 | | | | RLE-32 | | | | Overflows | |
|---|---|---|---|---|---|---|---|---|---|---|
| | Zero | | One | | Zero | | One | | | |
| Capture | Avg | St. Dev | Avg | St. Dev | Avg | St. Dev | Avg | St. Dev | Zero | One |
| A | 911.15 | 987.45 | 21.37 | 6.24 | 24985 | 342444 | N/A | N/A | 22 | 0 |
| B | 565.812 | 632.99 | 18.70 | 3.21 | 22706 | 230498 | N/A | N/A | 0 | 0 |
| C | 737.49 | 913.78 | 28.11 | 13.15 | 23195 | 132718 | N/A | N/A | 0 | 0 |

For comparison purposes only, an implementation of a known Bitmap encoding scheme referred to as WAH (Word Aligned Hybrid) was produced and the comparable statistics are presented in Table 10. To enable WAH to be comparable it had to have the header fields described in Section 4.1 added, which also includes storing no data for values that are not used. For this experiment only the Bitmap portion was swapped out; the packet offset compression, packet capture loading and threading model was left untouched. A search was constructed for each capture which yielded a few thousand hits so that a comparison could be made as effectively as possible. To improve the fairness of this test each index file was pre-cached in the Linux file cache before measurements took place, so as to eliminate filesystem I/O delays and as much unpredictability as possible. The timing was performed using the Linux application "time."

TABLE 10

| Cap- | Bitmap Size (MB) | | Build Time (seconds) | | Search Time (seconds) | |
|---|---|---|---|---|---|---|
| ture | WAH | IMVARLEX | WAH | IMVARLEX | WAH | IMVARLEX |
| A | 4384 | 1324 | 34.4 | 27.8 | 0.96 | 0.10 |
| B | 3115 | 738 | 22.5 | 17.5 | 0.22 | 0.11 |
| C | 1501 | 422 | 17.4 | 15.6 | 0.83 | 0.56 |

As can be seen from the above table, techniques in accordance with embodiments of the present disclosure outperform WAH significantly across all measurement criteria. In the search time it can be seen that WAH can be nearly 10 times slower than embodiments of the present disclosure which cannot be solely attributed to the increased WAH file size, which was only 3 times larger in that instance.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk, etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of real-time index generation of data in a data stream during data stream recording to an archive, the method comprising:
    receiving a byte of the data stream; and
    adding an entry for the byte of the data stream to a bitmap index of bytes, the bitmap index indicating, for each possible byte value, a location in the archive of each of occurrences and non-occurrences of the byte value by a sequence of bit values in the bitmap index, wherein the bitmap index includes a count of a number of occurrences for each byte value, wherein a plurality of run length encoding (RLE) schemes are applied to sub-sequences of identical bit values for each byte value in the index, each of the plurality of RLE schemes having a different encoding type identified by an encoding type indicator and indicating a bit value and a number of bits in a sub-sequence, wherein a pair of RLE encoded sub-sequences of indications of non-occurrence of a byte value implies a single indication of an occurrence of the byte value between the pair, and wherein adjacent RLE encoded indications of an occurrence of a byte value provided with a zero length indication therebetween is used to prevent the single indication.

2. The method of claim 1, wherein the data stream is network traffic on a communications network and the index is generated during line-rate network traffic recording.

3. The method of claim 1, wherein a size of the bitmap index is reduced by excluding trailing indications of non-occurrences of a byte value in a sequence of bit values of the byte value.

4. The method of claim 1, wherein the bitmap index includes, for each byte value, an indication of a size of a sequence of bit values for the byte value.

5. The method of claim 1, wherein the indication in the bitmap index of a location in the data stream is provided by reference to at least two intermediate arrays providing a base and offset to, when combined, address recording of the data stream.

6. A method for searching recorded network traffic for occurrence of a plurality of search bytes comprising:

using the bitmap index of claim 2 to identify indications of occurrence of each search byte wherein the search bytes are searched in order of frequency of occurrence in the bitmap index based on the count of a number of occurrences for each possible byte value in the bitmap index.

7. A computer system to generate an index of data in a data stream in real-time during data stream recording to an archive, the computer system comprising a processor and a data store, wherein the processor is adapted to:

receive a byte of the data stream; and add an entry for the byte of the data stream to a bitmap index of bytes, the bitmap index indicating, for each possible byte value, a location in the archive of each of occurrences and non-occurrences of the byte value by a sequence of bit values in the bitmap index, wherein the bitmap index includes a count of a number of occurrences for each byte value, wherein a plurality of run length encoding (RLE) schemes are applied to sub-sequences of identical bit values for each byte value in the index, each of the plurality of RLE schemes having a different encoding type identified by an encoding type indicator and indicating a bit value and a number of bits in a sub-sequence, wherein a pair of RLE encoded sub-sequences of indications of non-occurrence of a byte value implies a single indication of an occurrence of the byte value between the pair, and wherein adjacent RLE encoded indications of an occurrence of a byte value provided with a zero length indication therebetween is used to prevent the single indication.

8. A non-transitory computer-readable storage medium storing a computer program element comprising computer program code to, when loaded into a computer system and executed thereon, cause the computer to perform the method as claimed in claim 1.

* * * * *